United States Patent [19]

Schneider

[11] 4,128,544

[45] Dec. 5, 1978

[54] COPPER COMPLEXES OF SUBSTITUTED SULFOPHENYL-AZO-PHENYL-AZO-NAPHTHALENE SULFONIC ACIDS CONTAINING A HETEROCYCLIC FIBER-REACTIVE GROUP

[75] Inventor: Lukas Schneider, Basel, Switzerland

[73] Assignee: Sandoz Ltd., Basel, Switzerland

[21] Appl. No.: 734,277

[22] Filed: Oct. 20, 1976

Related U.S. Application Data

[63] Continuation of Ser. No. 582,072, May 30, 1975, abandoned, which is a continuation-in-part of Ser. No. 279,356, Aug. 10, 1972, abandoned.

[30] Foreign Application Priority Data

Aug. 16, 1971 [CH] Switzerland .................. 11998/71

[51] Int. Cl.² ............... C09B 45/28; C09B 62/08; C09B 62/24; D06P 1/382
[52] U.S. Cl. ............... 260/146 T; 260/146D; 260/153; 260/154; 260/191; 260/207
[58] Field of Search ............... 260/146 T, 146 D, 147, 260/153, 154

[56] References Cited

U.S. PATENT DOCUMENTS

| | | | |
|---|---|---|---|
| 2,860,128 | 11/1958 | Gunst | 260/153 |
| 3,036,058 | 5/1962 | Andrew et al. | 260/146 T |
| 3,038,893 | 6/1962 | Andrew | 260/146 T |
| 3,057,844 | 10/1962 | Andrew et al. | 260/146 T |
| 3,057,846 | 10/1962 | Andrew et al. | 260/146 T |
| 3,227,704 | 1/1966 | Schweizer et al. | 260/146 T |
| 3,234,204 | 2/1966 | Benz et al. | 260/146 D |
| 3,342,798 | 9/1967 | Dussy et al. | 260/146 D |
| 3,361,734 | 1/1968 | Schweizer et al. | 260/147 |
| 3,366,621 | 1/1968 | Benz et al. | 260/146 T |
| 3,377,335 | 4/1968 | Durig et al. | 260/146D |
| 3,433,781 | 3/1969 | Ackermann et al. | 260/146 D |
| 3,669,951 | 6/1972 | Bien et al. | 260/146 D |
| 3,711,460 | 1/1973 | Schundehutte | 260/154 |
| 3,853,840 | 12/1974 | Schundehutte et al. | 260/146 D |

FOREIGN PATENT DOCUMENTS

| | | | |
|---|---|---|---|
| 1541026 | 8/1968 | France | 260/146 T |
| 41-18108 | 10/1966 | Japan | 260/146 D |
| 6410848 | 9/1964 | Netherlands | 260/141 D |

Primary Examiner—Floyd D. Higel
Attorney, Agent, or Firm—Gerald D. Sharkin; Richard E. Vila; Melvyn M. Kassenoff

[57] ABSTRACT

Complexes of the formula

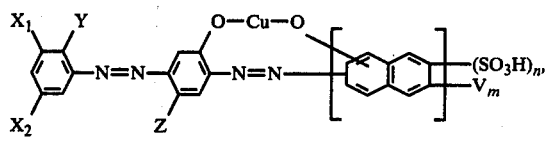

wherein
  V is hydroxy or amino, one of $X_1$ and $X_2$ is sulfo and the other is $-NHR_3$, wherein $R_3$ is heterocyclyl containing at least one substituent cleavable as an anion, preferably a halopyrimidyl or halotriazinyl group,
  Y is methyl, methoxy, ethoxy or methoxyethoxy,
  Z is hydrogen, methyl or methoxy,
  m is 0 or 1, and
  n is 2 or 3,
with the proviso that the $-N=N-$ and $-O-Cu-O-$ groups are bound to adjacent positions of the naphthalene ring, are useful for the dyeing or printing of natural or regenerated cellulosic fibres. The obtained dyeings and prints possess notable stability in alkaline medium and fastness to light and satisfactory fastness to wet treatments, chlorine and peroxide. The dyes possess notable build-up and fixation.

9 Claims, No Drawings

COPPER COMPLEXES OF SUBSTITUTED SULFOPHENYL-AZO-PHENYL-AZO-NAPHTHALENE SULFONIC ACIDS CONTAINING A HETEROCYCLIC FIBER-REACTIVE GROUP

This application is a continuation of application Ser. No. 582,072, filed May 30, 1975 and now abandoned, which is a continuation-in-part of application Ser. No. 279,356, filed Aug. 10, 1972 and now abandoned.

The present invention relates to novel copper-containing disazo compounds.

The invention provides compounds of formula I,

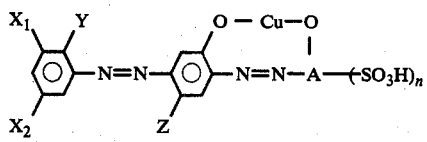   I in which
one of $X_1$ and $X_2$ signifies the sulphonic acid group and the other signifies a radical of the formula —NH—$R_3$, in which $R_3$ signifies a radical comprising a heterocyclic radical, which heterocyclic radical contains at least one substituent cleavable as an anion, Y signifies methyl, methoxy, ethoxy or methoxyethoxy, Z signifies hydrogen, methyl or methoxy, A signifies a naphthalene radical which is ortho coupled to the nitrogen and oxygen atoms and which, apart from the sulphonic acid groups, is unsubstituted or amino substituted, and n signifies the integer 2 or 3.

The invention also provides a process for the production of compounds of formula I which comprises condensing a compound of formula II,

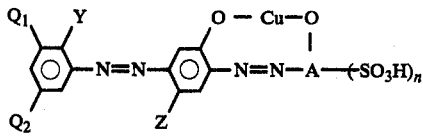   II in which Y, Z, A and n are as defined above, and one of $Q_1$ and $Q_2$ signifies the sulphonic acid group and the other signifies the amino group, with a compound of formula VIII, $$R_3-W \qquad \text{VIII}$$

in which
$R_3$ is as defined above, and
W signifies a leaving group which is split off in condensation with a primary amino group.

The process is suitably carried out using approximately equimolar quantities of reactants. The process is preferably carried out in aqueous medium, and the compound of formula VIII may be used in solution in an organic solvent, especially suitable solvents being acetone, benzene, chlorobenzene and toluene. The reaction temperature is not critical and suitable temperatures may be chosen according to the reactivity of the compound of formula VIII, but generally suitable temperatures are from 5° to 80° C. While the reaction may be carried out effectively in a weakly alkaline, neutral or weakly acid medium, the preferred pH is from 4 to 6. It is preferred to neutralize the acid formed during the reaction by the addition of small amounts of sodium or potassium bicarbonate or carbonate in solid pulverized form or as a concentrated aqueous solution; other suitable acid-binding agents are aqueous solutions of sodium or potassium hydroxide. Small amounts of a wetting or emulsifying agent may be used if required to accelerate the rate of reaction. The compounds of formula I may be isolated in known manner, for example by precipitation and filtration with suction, and may then be dried.

As indicated above, $R_3$ is the radical attached to the amino group when a compound of formula VIII is condensed with a primary amino group. Suitable compounds of formula VIII are: 2,4,6-trichloro-s-triazine, 2,4-dichloro-6-mono- and -di-sulphophenylamino-s-triazine, 2,4-dichloro-6-amino-s-triazine, 2,4-dichloro-6-methoxy-s-triazine, 2,4-dichloro-6-methylamino-s-triazine, 2,4-dichloro-6-diethanolamino-s-triazine, 2,3-dichloroquinoxaline-6-carboxylic acid chloride, 3,8-dichlorophthalazine-5-carboxylic acid chloride, 4,5-dichloropyridazine-6-on-1-yl-β-propionyl chloride, 2-chlorobenzothiazole-5-carboxylic acid chloride, 4,5-dichloro-6-methyl-2-methylsulfonyl pyrimidine, 2,4,5,6-tetrachloropyrimidine, 2,4,6-trichloropyrimidine, 5-chloro-2,4,6-trifluoropyrimidine, 2,4,6-trifluoropyrimidine, 2,4,6-trifluoro-5-methylpyrimidine and 2,4,6-trifluoro-5-bromopyrimidine. Preferred substituents cleavable as an anion are fluorine, chlorine and bromine. Preferred leaving groups W are also fluorine, chlorine and bromine.

Preferred radicals $R_3$ are those of formulae VI and VII,

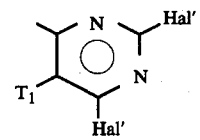   VI wherein
Hal' signifies bromine or, preferably, chlorine or fluorine, and
$T_1$ signifies hydrogen, alkyl of 1 to 4 carbon atoms, fluorine, bromine or, preferably, chlorine;

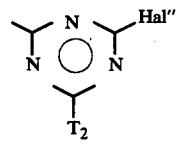   VII wherein
Hal" signifies fluorine, bromine or preferably, chlorine, and
$T_2$ signifies alkoxy of 1 to 4 carbon atoms, amino, alkylamino or hydroxyalkylamino of 1 to 4 carbon atoms, dialkylamino or di(hydroxyalkyl)amino in which each alkyl is independently of 1 to 4 carbon atoms, sulfophenylamino (sulfoanilino), disulfophenylamino (disulfoanilino), bromine, fluorine or, preferably, chlorine.

The copper-containing aminodisazo compounds of formula II used as starting materials may be produced, for example, by coupling in weakly acid to neutral medium the diazo compound from an amine of formula III,

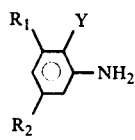

wherein one of $R_1$ and $R_2$ signifies a sulphonic acid group and the other an acylamino group (e.g., acetyl-, propionyl-, benzoyl-, methoxycarbonyl- or ethoxycarbonylamino), with an optionally sulphomethylated amine of formula IV,

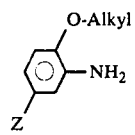

wherein alkyl is of 1 to 4 carbon atoms, e.g. methyl or ethyl, and Z signifies hydrogen, methyl or methoxy, if necessary with cleavage of the sulphomethyl group, followed by diazotization of the aminomonoazo compound formed, coupling with a hydroxynaphthalenesulphonic acid of formula V,

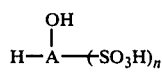

wherein

signifies a hydroxynaphthalene capable of coupling in the position ortho to the hydroxyl group, and n is as defined above, splitting off of the acyl group of the resulting disazo compound, and finally coppering the aminodisazo dye under dealkylating conditions. In general, the various steps are effected in manner known per se.

Splitting off of a sulphomethyl group takes place effectively in alkaline medium at 40° to 70° C.

For the coppering reaction under dealkylating conditions it is preferable to employ an ammoniacal copper (II) sulphate, acetate or chloride solution, if necessary with the addition of an organic water-soluble base such as an alkyl amine, alkanol amine, pyridine or dimethylformamide, and to work in the temperature range of, e.g., 80° to 100° C.

Examples of suitable amines of formula III are 1-amino-2-methyl-3-propionylaminobenzene-5-sulphonic acid, 1-amino-2-methoxy-3-acetylaminobenzene-5-sulphonic acid, 1-amino-2-methyl-5-benzoylaminobenzene-3-sulphonic acid, 1-amino-2-methoxy-5-acetylaminobenzene-3-sulphonic acid and 1-amino-2-methoxyethoxy-5-methoxycarbonylaminobenzene-3-sulphonic acid.

Examples of suitable amines of formula IV, are 1-amino-2-methoxy- and -ethoxy-benzene, 1-amino-2-methoxy-5-methylbenzene and 1-amino-2,5-dimethoxybenzene.

Suitable hydroxynaphthalenesulphonic acids of formula V include: 1-hydroxynaphthalene-3,6-, -4,6- and -4,7-disulphonic acid, 1-hydroxynaphthalene-3,6,8-trisulphonic acid, 2-hydroxynaphthalene-3,6- and 6,8-disulphonic acid, 2-hydroxynaphthalene-3,6,8-trisulphonic acid, 1,8-dihydroxynaphthalene-3,6-disulphonic acid and 1-hydroxy-8-aminonaphthalene-5,7-disulphonic acid.

The compounds of formula I are reactive dyes suitable for the exhaust dyeing, pad dyeing and printing of natural and regenerated cellulosic fibres, e.g. cotton, linen, viscose rayon and cuprammonium rayon, including blends and other manufactured forms of these fibres. The optimum conditions of application depend on the nature and composition of the textile substrate and on the dyes selected for it.

In exhaust dyeing, pad dyeing and printing it is advantageous to apply and fix the dyes from alkaline medium, e.g. in the presence of sodium bicarbonate sodium carbonate, sodium hydroxide, potassium hydroxide, sodium metasilicate, sodium borate, trisodium phosphate, ammonia, etc. It is often advantageous to include a mild oxidizing agent such as sodium 1-nitrobenzene-3-sulphonate in the medium to prevent reduction effects in dyeing or printing. The dyes may be fixed at room temperature or at temperatures up to about 160° C.

The chemical reaction of the dye with the fibre is never quantitative. The proportion of unreacted dye is cleared from the substrate by treatments such as washing off and/or soaping, if necessary at high temperature, for which purpose synthetic detergents can be used, e.g. alkylaryl sulphonates, sodium lauryl sulphate, sodium lauryl polyglycol either sulphate and monoalkylphenyl or dialkylphenyl polyglycol ethers.

The dyes possess good build-up and fixation on cellulosic fibers and the dyeings and prints obtained on cellulosic fibres are notable for good stability in alkaline medium and light fastness properties, and satisfactory wash fastness, water fastness, chlorinated water fastness, peroxide washing fastness, dischargeability, acid hydrolysis and weak acid fastness properties, which are due to the formation of a stable chemical linkage between the dye molecule and the cellulose molecule.

The radical Y in the dyes of formula I increases their tinctorial strength (yield) above that of similar dyes which in the place of Y bear a hydrogen atom or a sulphonic acid group. A sulphonic acid group is present in the same benzene ring in which the radical Y occurs, and this greatly increases the solubility and so facilitates removal of the chemically unreacted portion of the dye in the washing-off baths. The best behaviour in washing-off is shown by dyes in which the radical Y is methoxy, ethoxy or methoxyethoxy.

Notably high stability of the dye-fibre linkage after fixation is evident in dyeings produced with reactive dyes of formula I in which $R_3$ is a radical of formula VI, and consequently the wet fastness properties of the dyeings in alkaline and acid medium are good. The dyes which contain a radical of formula VI in which the two substituents designated Hal' represent fluorine, have the merit of reacting easily and rapidly with the fibre and reaching high fixation values. These fluorine-containing dyes can therefore be rapidly fixed on the textile substrate to a very high percentage and show good wet fastness properties.

Reactive dyes of formula I in which $R_3$ is a radical of formula VII, where Hal'' and $T_2$ both signify chlorine also react rapidly with the fibre, but their wet fastness is not as good as that of compounds containing a radical of formula VI. Compounds which contain a radical of formula VII in which Hal" represents chlorine and T₂ an unsubstituted or substituted amino group react considerably more slowly with the fibre.

The compounds of formula I in which n signifies the integer 3 are suitable for both textile dyeing and printing. A valuable characteristic of these for printing is that the unfixed proportion of dye can be readily washed off the printed fabric without significant staining of the white unprinted areas. The compounds of formula I in which n signifies 2 are less suitable for textile printing, but they are applicable by dyeing processes including exhaustion dyeing.

The following Examples illustrate the invention. Therein, the parts and percentages are by weight and the temperature is in degrees Centigrade.

EXAMPLE 1

40 Parts of the aminodisazo compound of formula IX,

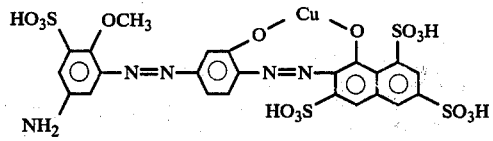

in the form of its sodium salt, are dissolved in 600 parts of water. Over the period of about 2 hours, 10 parts of 2,4,6-trifluoro-5-chloropyrimidine are gradually added at 15–20° with stirring, while the pH is maintained at 5.0 to 5.5 by the addition of 5 parts of sodium bicarbonate. The mixture is stirred further for 10 hours, after which time condensation is complete. The compound formed is precipitated with 150 parts of sodium chloride, isolated by filtration and vacuum dried at 70°. It is then ground to give a dark powder which dissolves in water with a blue colour. Applied to fabrics of cotton or regenerated cellulosic fibre by padding from alkaline liquors, it gives navy blue shades of very good light and wet fastness. The compound produced is of formula Ia,

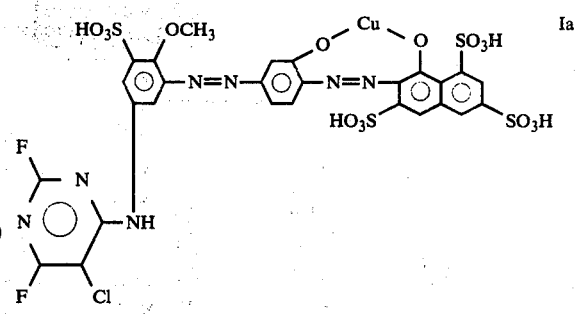

The starting compound of formula IX used in this Example is synthesized in accordance with known methods starting from the diazo compound of 1-amino-2-methoxy-5-acetylaminobenzene-3-sulphonic acid. This compound is coupled in weakly acid to neutral medium with an equivalent amount of 1-methoxy-2-ω-sulphomethylaminobenzene, the sulphomethyl group in the resulting monoazo dye split off by alkaline saponification, e.g. with calcium hydroxide, the aminodisazo compound formed diazotized and the disazo compound coupled with 1-hydroxynaphthalene-3,6,8-trisulphonic acid in the presence of sodium carbonate. The resulting disazo compound is then coppered under dealkylating conditions, after which the acetylamino group is saponified with sodium hyroxide solution to give the copper-containing aminodisazo compound of formula IX.

The following Table specifies further compounds of formula I. They are identified by the significances of the substituents $X_1$, $X_2$, Y, Z and the hydroxynaphthalenesulphonic acid on which the radical

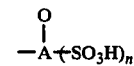

is based and by the shade of the dyeings or prints on cellulosic fibre. The letters in the sixth column denote:
  D: 1-hydroxynaphthalene-3,6,8-trisulphonic acid
  E: 1-hydroxynaphthalene-4,6-disulphonic acid
  F: 1-hydroxynaphthalene-3,6-disulphonic acid
  G: 1-hydroxy-8-aminonaphthalene-5,7-disulphonic acid Table

| Example No. | $X_1$ | $X_2$ | Y | Z | OH<br>\|<br>H—A—(SO₃H)ₙ | Shade on cellulosic fibres |
|---|---|---|---|---|---|---|
| 2 | —SO₃H | 2,4-dichloro-sym. 6-triazin-ylamino | OCH₃ | H | D | navy blue |
| 3 | " | " | " | —CH₃ | " | " |
| 4 | " | " | —CH₃ | H | " | reddish blue |
| 5 | " | " | —OCH₃ | H | E | " |
| 6 | " | " | " | " | G | navy blue |
| 7 | " | " | " | " | 2-hydroxy-naphthalene-3,6,8-tri-sulphonic acid | reddish blue |
| 8 | 2,4-dichloro-sym. 6-triazin-ylamino | —SO₃H | " | " | D | navy blue |
| 9 | " | " | —CH₃ | " | " | " |
| 10 | " | " | —OCH₃ | " | 1,8-dihydroxynaphthalene-3,6-disulphonic acid | greenish blue |

Table—continued

| Example No. | $X_1$ | $X_2$ | Y | Z | $\overset{OH}{\underset{H-A-(SO_3H)_n}{\mid}}$ | Shade on cellulosic fibres |
|---|---|---|---|---|---|---|
| 11 | " | " | " | " | F | reddish blue |
| 12 | —SO$_3$H | 5-chloro-2,4-difluoro-6-pyrimidylamino | —OCH$_3$ | —H | F | " |
| 13 | —SO$_3$H | 6-chloro-2,4-difluoro-6-pyrimidylamino | —OCH$_3$ | —CH$_3$ | 1,8-dihydroxynaphthalene-3,6-disulphonic acid | greenish blue |
| 14 | " | " | " | —H | 2-hydroxy-naphthalene-3,6,8-trisulphonic acid | reddish blue |
| 15 | " | " | " | —H | G | navy blue |
| 16 | " | " | H$_3$C—O—C$_2$H$_4$—O— | —H | D | " |
| 17 | " | " | —CH$_3$ | —H | " | " |
| 18 | " | " | —CH$_3$ | —OCH$_3$ | " | " |
| 19 | " | " | —CH$_3$ | —H | E | reddish blue |
| 20 | " | 5-bromo-2,4-difluoro-6-pyrimidylamino | —O—CH$_3$ | —H | 1-hydroxy-naphthalene-4,7-disulphonic acid | " |
| 21 | 2,4-difluoro-6-pyrimidylamino | —SO$_3$H | —OCH$_3$ | —H | D | navy blue |
| 22 | 5-methyl-2,4-difluoro-6-pyrimidylamino | " | " | —H | " | " |
| 23 | 5-chloro-2,4-difluoro-6-pyrimidylamino | " | " | —H | " | " |
| 24 | " | " | —CH$_3$ | —H | " | reddish blue |
| 25 | " | " | " | —CH$_3$ | " | " |
| 26 | " | " | —OCH$_3$ | —H | G | navy blue |
| 27 | " | " | " | —H | F | reddish blue |
| 28 | —SO$_3$H | 2,4,5-trichloro-6-pyrimidylamino | " | —H | D | navy blue |
| 29 | " | " | " | —CH$_3$ | " | " |
| 30 | " | " | " | —H | F | reddish blue |
| 31 | " | " | —CH$_3$ | —H | D | " |
| 32 | " | " | " | —H | G | navy blue |
| 33 | 2,4,5-trichloro-pyrimidylamino-(6)- | —SO$_3$H | —OCH$_3$ | —H | D | " |
| 34 | —SO$_3$H | 5-chloro-6-methyl-2-methylsulphonyl-4-pyrimidylamino | " | " | " | " |
| 35 | " | 2,3-dichloroquinoxaline-6-carbonamido | " | " | " | " |
| 36 | " | 3,8-dichlorophthalazine-5-carbonamido | " | " | " | " |
| 37 | " | 4,5-dichloropyridazine-6-on-1-yl-β-propionylamino | " | " | " | " |
| 38 | —SO$_3$H | 2-chloro-4-(3'-sulphophenylamino)-sym.6-triazin- | —OCH$_3$ | —H | " | " |

Table—continued

| Example No. | $X_1$ | $X_2$ | Y | Z | $H-A-(SO_3H)_n$ with OH | Shade on cellulosic fibres |
|---|---|---|---|---|---|---|
| 39 | —SO$_3$H | ylamino 2-chloro-4-amino-sym. 6-triazinyl-amino | —OCH$_3$ | —H | D | navy blue |
| 40 | " | " | —CH$_3$ | —H | " | reddish blue |
| 41 | " | 2-chloro-4-(2',5'-disulpho-phenyl-amino)-sym. 6-triazinyl-amino | —OCH$_3$ | —H | F | " |
| 42 | 2-chloro-4-methoxy-sym. 6-tri-azinyl-amino | —SO$_3$H | " | —H | D | navy blue |
| 43 | 2-chloro-4-dieth-anolamino-sym. 6-triazinyl-amino | " | " | —H | " | " |
| 44 | 2-chloro-4-methyl-amino-sym. 6-triazinyl-amino | " | " | —H | G | " |
| 45 | —SO$_3$H | 5-chloro-2,4-di-fluoro-6-pyrimidy-lamino | —OCH$_3$ | —CH$_3$ | D | navy blue |
| 46 | " | 2,4-di-chloro-sym. 6-triazinyl-amino | —CH$_3$ | —OCH$_3$ | " | " |

EXAMPLE A (exhaust dyeing)

0.3 Parts of the compound of Example 2 are dissolved in 100 parts of water, with the subsequent addition of 5 parts of calcined sodium sulphate. At 20–25° 10 parts of mercerized cotton sateen are entered into this dyebath and dyed for 30 minutes. Then 2 parts of calcined sodium carbonate and 4 parts of trisodium phosphate, both as 20% aqueous solutions, are added and treatment continued for 1 hour at constant temperature for fixation of the dyeing. On removal from the bath the fabric is rinsed, soaped for 15 minutes at the boil, rinsed and dried. A navy blue dyeing having good light and wet fastness is obtained.

EXAMPLE B (pad dyeing)

Two parts of the compound of Example 2 are dissolved in 100 parts of warm water, 10 parts of urea are added, and after the solution has cooled to 20° it is set with 30 parts of 10% sodium carbonate solution and 0.5 parts of sodium 1-nitrobenzene-3-sulphonate. This liquor is padded on a fabric of spun rayon at an expression giving an increase of 75% on the dry weight. After intermediate drying, the pad dyeing is fixed by treatment for 5 minutes in wet steam at 102°. Finally, the fabric is rinsed, soaped for 15 minutes at the boil, rinsed again and dried. A navy blue dyeing is obtained which has good light and wet fastness properties.

EXAMPLE C (printing)

A printing paste of the following composition is prepared:

| | |
|---|---|
| 20 parts | of the compound of Example 1 |
| 100 parts | urea |
| 355 parts | water |
| 500 parts | sodium alginate thickening 3% |
| 10 parts | sodium 1-nitrobenzene-3-sulphonate |
| 15 parts | sodium bicarbonate |
| 1000 parts | |

The paste is printed on a mercerized cotton sateen fabric and the print fixed by steaming for 2–4 minutes at 102°–104°. The fabric is then rinsed with cold and warm water, soaped at the boil, rinsed again and dried. A navy blue print with good light and wet fastness is obtained.

What is claimed is:

1. A compound of the formula

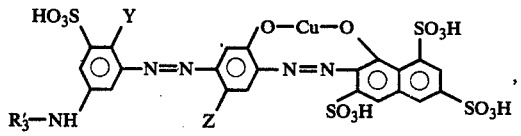

wherein $R_3'$ is

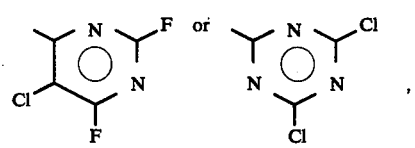

Y is methyl, methoxy or methoxyethoxy, and Z is hydrogen, methyl or methoxy.

2. A compound according to claim 1 wherein Y is methyl or methoxy.

3. The compound according to claim 2 having the formula

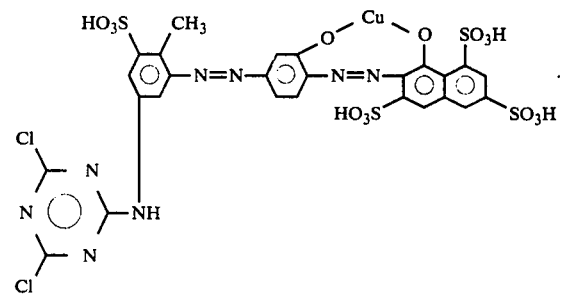

4. The compound according to claim 2 having the formula

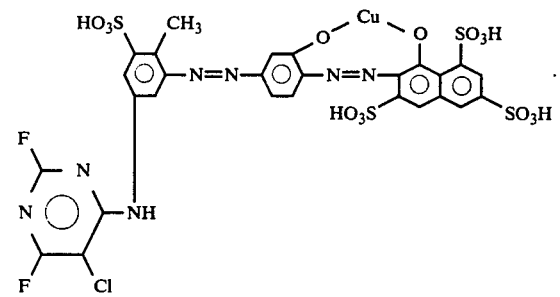

5. The compound according to claim 2 having the formula

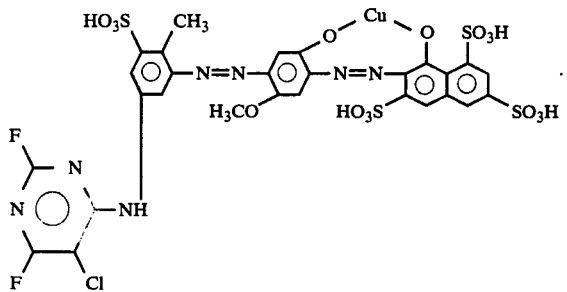

6. The compound according to claim 2 having the formula

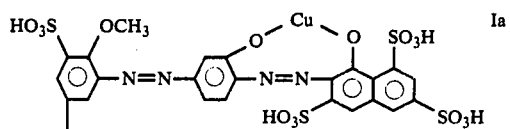

7. The compound according to claim 2 having the formula

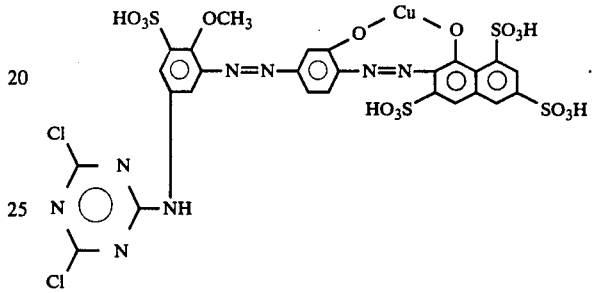

8. The compound according to claim 2 having the formula

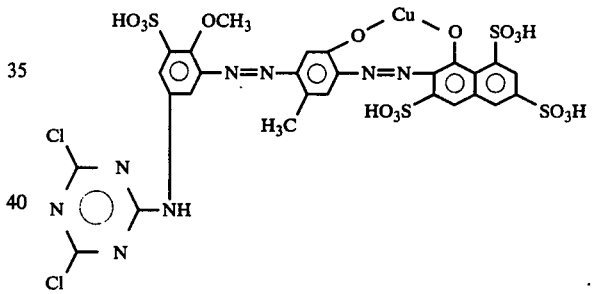

9. The compound according to claim 1 having the formula

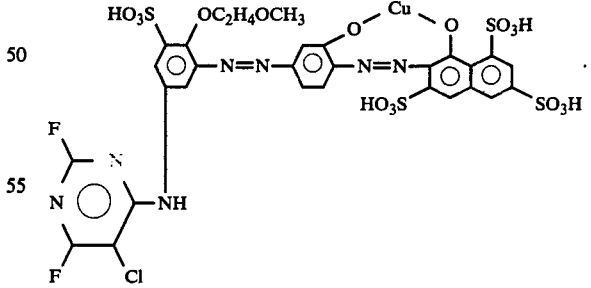

* * * * *